April 19, 1966        KAKUJI NAITO        3,246,672

METHOD AND STRUCTURE FOR RECLOSABLE CONTAINERS

Original Filed Feb. 15, 1961        3 Sheets-Sheet 1

Inventor
Kakuji Naito by Hill, Sherman, Meroni, Gross & Simpson

Attys.

April 19, 1966 KAKUJI NAITO 3,246,672
METHOD AND STRUCTURE FOR RECLOSABLE CONTAINERS
Original Filed Feb. 15, 1961 3 Sheets-Sheet 2
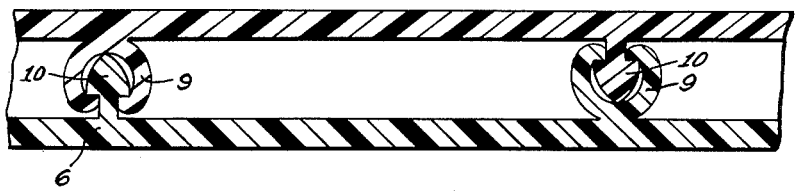
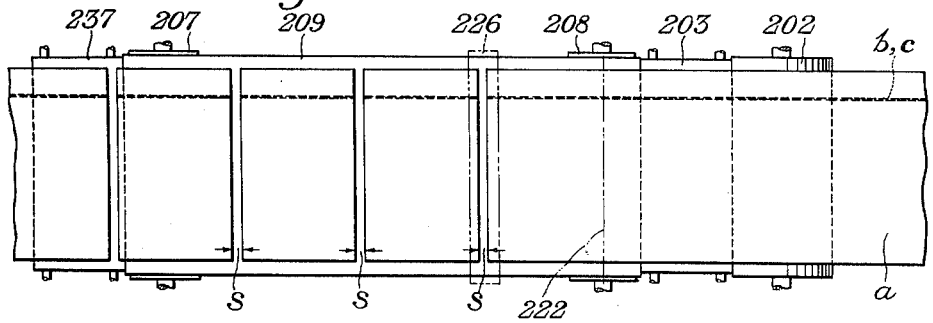
Inventor
Kakuji Naito Inventor
Kakuji Naito United States Patent Office 3,246,672
Patented Apr. 19, 1966

3,246,672
METHOD AND STRUCTURE FOR RECLOSABLE CONTAINERS
Kakuji Naito, Kawasaki-shi, Kanagawa-ken, Japan, assignor to Kabushiki Kaisha Seison Nikon Sha, Tokyo, Japan, a corporation of Japan
Original application Feb. 15, 1961, Ser. No. 89,540. Divided and this application Oct. 23, 1963, Ser. No. 325,197
7 Claims. (Cl. 138—118)

This invention relates to bags and tubes for manufacturing bags made of synthetic resin, wherein have been formed integral with the bag material at the inner surface of the bag mouth vis-a-vis each other, a male rib and a female rib which are provided as to be occlusive with respect to each other, the present application being a division of my copending application Serial No. 89,540, filed February 15, 1961.

In making the tubular bag material, the bag material is molded into a long continuous tube, which is obtained by extruding from a conventional extruder a synthetic resin under heated state upward through an annular extrusion gap to form continuously a tubular body in which are formed by means of incision-like molding grooves provided in a section of the annular extrusion gap simultaneously in the inner surface thereof raised male and female ribs parallel with the line of generation of the tubular body. Then, in transporting this while clasped in a state of flatness by means of a pair of rolls provided at the top of the apparatus, air is first blown from the aforesaid molding mold into the tubular bag body to maintain the same in a swelled state between the mold and the aforesaid rolls and by concurrently blowing in cold air uniformly from air inlet pipes surrounding the tubular body against the tubular body maintained in the swelled state the film is cooled uniformly. The tubular body is then guided for engaging the occludent means.

The bag material which is now flat and maintaining its occluded state can be finished into individual bags by cutting followed by sealing the cut edges. In actual practice, however, owing to the necessity of accomplishing printing of such as trademarks, trade names, etc. on the bag surface, the bag material that has been formed in a flat and continuous state, as described hereinabove, is first wound up on a reel, transferred to the printing step where after printing it is rewound on the reel and thereafter cut and the cut edges simultaneously sealed.

The mode of practicing the invention will be described concretely below with reference to the accompanying drawings, in which:

FIG. 5 is a top plan view showing separate bags formed on a conveyor belt after having been cut from the tube material and cross sealed;

FIG. 6 is an enlarged view in section of the resultant synthetic resin bag;

FIG. 10 is an enlarged detailed fragmentary sectional view of the interlocking occludent means.

Figure 4:
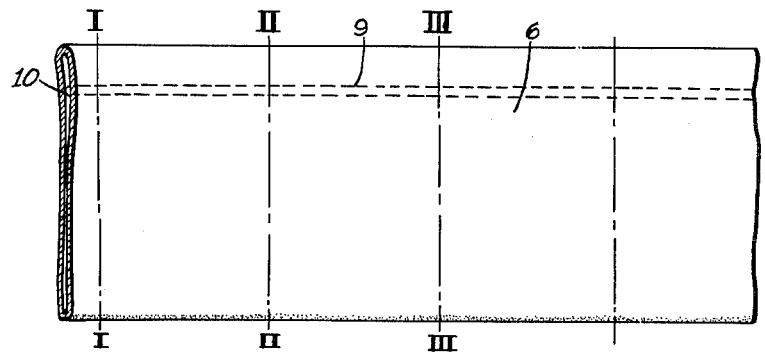
FIG. 4 is a top plan view showing the bag material subsequent to its having been occluded.
Figure 1:
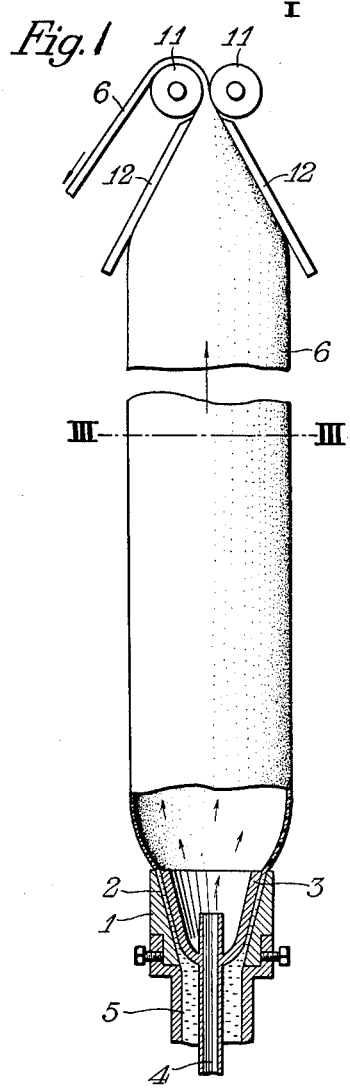
FIG. 1 is a detailed front elevation of that section of a mechanism which continuously molds the bag material.
Figure 2:
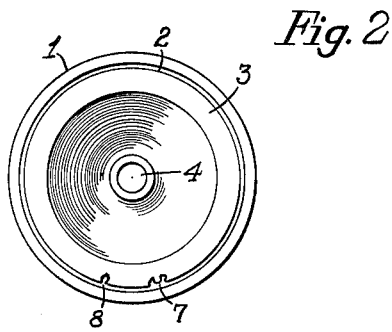
FIG. 2 is a top plan view of a mold section for making the bag material.
Figure 3:
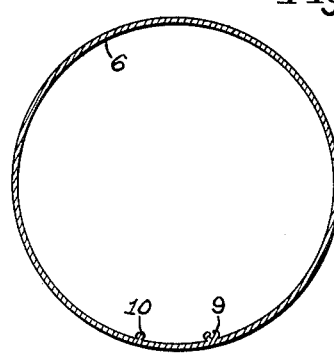
FIG. 3 is a cross-sectional view of the bag material taken along lines III—III of FIG. 1.

As shown in FIGURES 1 and 2 an outer mold 1 has a core 3 with a shaped narrow annular extrusion gap 2 therebetween. Plastic is forced through the gap 2 by extruder mechanism not shown, and air introduced into a tube extruded through the gap 2 through a pipe 4. As illustrated the gap is preferably of uniform width to form a tube of film of uniform thickness. There are formed molding grooves 7 and 8 in the outer surface of the core 3 communicating with the extrusion gap 2 for forming male and female ribs 9 and 10 integrally with the bag body 6.

Directly above this mold (FIG. 1) there is provided a pair of delivery rolls 11, 11 disposed in lateral fashion facing each other for clasping and delivering in a flat state the tubular bag body 6 that is extruded from the mold. Air is blown in small amounts into the tubular bag body 6 from the bottom through the aforesaid air inlet pipe 4, with the top part of the bag body 6 being held together by means of the delivery rolls 11, 11. The bag body 6 is swelled or inflated and maintained in a tubular shape. Below the rolls 11, 11 there is provided a pair of guide plates 12, 12 facing each other in roof fashion whereby the shoulder portion of the bag body 6 swelled into a tubular shape is guided and is gradually pressed flat as shown in FIG. 1 and passes between the rolls 11, 11.

At that part of the apparatus where the tubular bag body 6 ascends, a cold air discharge section, not shown, is provided. Air is appropriately supplied and is blown against the outer surface of the bag body 6 to remove heat from the freshly molded film and thus cool the same.

The interlocking elements 9 and 10 are aligned and interlocked to hold the opposed sides of tube material together. The bag body 6 is thus molded into a flat belt-like shape. In actual practice, however, since in most cases printing of such as trademarks, trade names, etc. are accomplished, it is perhaps convenient to first wind up the bag material in this state by guiding the same to a windup reel.

Figure 7:
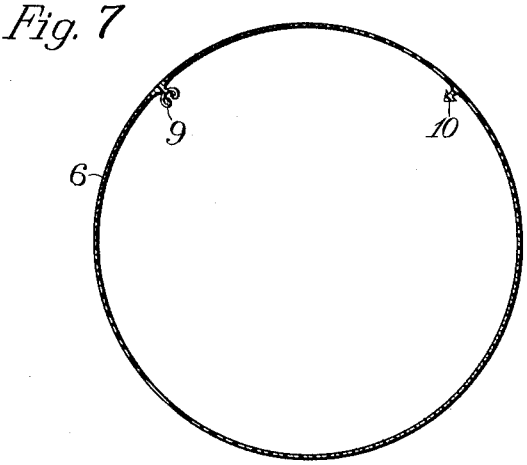
FIG. 7 is an enlarged view in section showing a modification of the occluding ribs.
Figure 8:
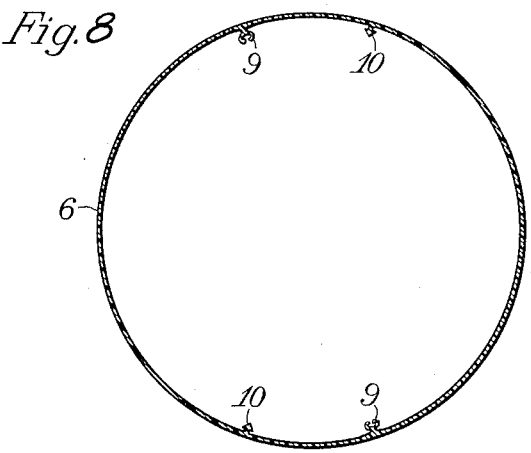
FIG. 8 is a cross-sectional view showing the bag material in which two sets of occluding ribs have been formed.
Figure 9:
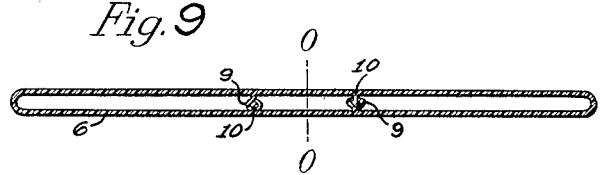
FIG. 9 is a descriptive drawing showing the above bag material in its flattened form and the location where it is to be cut.

In the hereinabove-described apparatus, the cross-sectional shape of the male and female ribs suitable for occlusion of the bag body 6 can be obtained by suitably designing the configuration of the molding grooves 7, 8. The cross-sectional shape of these male and female elements 9, 10 may be suitably determined in acordance with the uses to which the bags are to be put. For example, as shown in FIG. 7, for a container to be used for fine powders the ribs may be so formed so that the labial section of the female rib 9 is turned inward along the length of the rib while the male rib 10 is formed arrowhead shaped. In addition, regardless of the shapes of the male and female ribs, when two sets thereof are formed facing each other, as illustrated in FIG. 8, and subsequently cut along line 0—0 midway between the two when the bag body has been flattened as in FIG. 9, two bags are obtainable at the same time. FIG. 10 shows the rib and groove elements 9 and 10 in greater detail.

The incisions 7 and 8, which constitute a set of the molding grooves are incised in a part of the circumference of the core 3 with the shape of the grooves being of a wide variety. Since their positions will be determined by the size of the mold, by providing molding plates for the core of the same size having a wide variety of incisions and selectively using the same, it becomes possible to form ribs of any desired shape.

The bag body that has been molded as described hereinbefore is then processed further in the following manner. First, the male and female ribs that have been formed integrally in the bag body are occluded, then after flattening, to the surface of the bag body is imparted, if required, the desired printing and thereafter by using an apparatus to be described hereinafter the bag body is cut into the individual bag and simultaneously therewith the cut edges of the bags are heat sealed.

In a position forward of a belt 203, rollers 207, 208 are disposed longitudinally, around which an endless conveyor belt 209 is mounted. The tip of the bag body 6 which is delivered forth, FIGURE 5, is made to be transferred smoothly from the belt 203 to the radially moving part of the conveyor belt 209. The surface of this conveyor belt 209 by being imparted a layer of such as, for example, silicon rubber is maintained so that the bag body does not stick to the surface of the conveyor belt as a result of operations such as cutting and heat sealing. In addition, by suitable determination of the rotating speed of the rollers 207, 208, the rate of travel of the conveyor belt 209 is made to be greater than that of the bag body 6. An electro-thermic means is provided, which makes possible simultaneously with the cutting of the bag body the heat sealing of the cut edges. A pressure plate 226 is provided. The individual bags are severed and sealed as shown in the copending application Serial 89,540. Further, at 237 is a set of superposed belts that have been provided forward of the conveyor belt 209 and have been provided for the purpose of removing the bags that have been conveyed by the conveyor belt 209.

When the continuous tube is cut into predetermined widths starting at one end and the cut edges thereof are heat sealed, as a result of the fact that a unit width of a bag body leaves the bag body material and is placed independently upon the top of the conveyor belt 209, the cut edges become spaced apart automatically from each other for an S distance.

In using these bags, by cutting the bags at the top *f*, FIG. 6, and opening up the engagement of the male and female ribs, the bag is ready to be filled with whatever it is to be filled with. After the bags are filled the male and female ribs 9, 10 are again occluded, and if necessary, the mouth which was opened by cutting may be again sealed using a heat sealer.

While the invention has been described with particular reference to specific embodiments, it is to be understood that it is not to be limited thereto, but that changes may be made therein without departing from the scope of the invention which is defined in the appended claims.

Having thus set forth the nature of the invention, what is claimed is:

1. A structure for use in making a reclosable container comprising, an elongated flexible closed integral tube of a flexible plastic film, and first and second interlocking elements integral with the tube on the surface thereof shaped for cooperative pressure interengagement and for forcible separation, said elements spaced apart from each other in both circumferential directions, said film including a body forming sheet portion between the interlocking elements at one side of the first element for forming the body of a bag formed from the tube, and said film including a flange forming sheet portion between the interlocking elements at the other side of said first element which may be subsequently separated axially along its length between the first and second elements for providing access to the bag formed from the tube and providing a separate opening gripping flange for each element.

2. In combination, an elongate closed flexible integral tube of a flexible plastic film, a rib element extending axially along within said tube, a groove element extending axially along within said tube, said rib and groove elements being complementary shaped to interlock with the application of force to the outer surface of the tube at the elements and to separate when forcibly drawn apart, said elements being interlocked to hold the opposing sides of the tube together and to hold the elements in their interlocked relationship, said elements spaced apart from each other in both circumferential directions, said film including a body forming sheet portion between the interlocking elements at one side of the first element for forming the body of a bag formed from the tube, and said film including a flange forming sheet portion between the interlocking elements at the other side of said first element which may be subsequently separated axially along its length between the first and second elements for providing access to the bag formed from the tube and providing a separate opening gripping flange for each element.

3. In combination, an elongated closed flexible integral tube of a flexible plastic film, first and second rib elements extending axially along within said tube, first and second groove elements extending axially along within said tube, said first rib and groove elements and said second rib and groove elements being complementary shaped and positioned to be capable of being interlocked with the application of force to the outer surface of the tube at the element and to separate when forcibly drawn apart, said elements spaced apart from each other in circumferential directions, said film including body forming sheet portions positioned outside of elements when interlocked to be at one side of each of the male elements for forming the bodies of bags formed from the tube, and said film including flange forming sheet portions being between the elements when interlocked and being at the other side of each of the male elements and which may be subsequently separated axially along their length for providing a separate opening gripping flange for each element.

4. A structure for use in making a reclosable container comprising, an elongated flexible closed integral tube of a flexible plastic film, and first and second interlocking elements integral with the tube on the surface thereof shaped for cooperative pressure interengagement and for forcible separation, said first interlocking element being arrowhead shaped in cross section and said second interlocking element being shaped to form a groove to embrace and interlock with said first element, said elements spaced apart from each other in both circumferential directions, said film including a body forming a sheet portion between the interlocking elements at one side of the first element for forming the body of a bag formed from the tube, and said film including a flange forming sheet portion between the interlocking elements at the other side of said first element which may be subsequently separated axially along its length between the first and second elements for providing access to the bag formed from the tube and providing a separate opening gripping flange for each element.

5. A structure for use in making a reclosable container comprising, an elongated flexible closed integral tube of a flexible plastic film, and first and second interlocking elements integral with the tube on the surface thereof shaped for cooperative pressure interengagement and for forcible separation, said elements spaced apart from each other in both circumferential directions, said film including a body forming sheet portion between the interlocking elements at one side of the first element for forming the body of a bag formed from the tube, said film including a flange forming sheet portion between the interlocking elements at the other side of said first element which may be subsequently separated axially along its length between the first and second elements for providing access to the bag formed from the tube and providing a separate opening gripping flange for each element, and said flexible plastic film being of substantially uniform thickness for said flange portion and said body portion.

6. A structure for use in making a reclosable container, comprising, an elongated flexible closed integral tube of a flexible plastic film, and first and second interlocking elements integral with the tube on the surface thereof shaped for cooperative pressure interengagement and for forcible separation, said interlocking elements being on the inner surface of said tube and projecting therefrom, said elements spaced apart from each other in both circumferential directions, said film including a body forming sheet portion between the interlocking elements at one side of the first element for forming the body of a bag formed from the tube, and said film including a flange forming sheet portion between the interlocking elements at the other side of said first element which may be subsequently separated axially along its length between the first and second elements for providing access to the bag formed from the tube and providing a separate opening gripping flange for each element.

7. A structure for use in making a reclosable container in accordance with claim 20 wherein said first rib and groove elements and said second rib and groove elements are interlocked holding the opposing sides of the tube together.

References Cited by the Examiner

UNITED STATES PATENTS

| | | | |
|---|---|---|---|
| 1,981,059 | 11/1934 | Matthews et al. | 156—251 |
| 2,461,976 | 2/1949 | Schenk | 264—95 |
| 2,564,093 | 8/1951 | Bijl | 138—177 |
| 2,674,289 | 4/1954 | Silverman | 150—3 |
| 2,740,740 | 4/1956 | Binnal | 156—251 |
| 2,746,502 | 5/1956 | Graell | 150—3 |
| 2,750,631 | 6/1956 | Johnson | 264—95 |
| 3,038,205 | 6/1962 | Plummer | 138—166 |
| 3,088,495 | 5/1963 | Svec | 138—128 |

FOREIGN PATENTS

| | | |
|---|---|---|
| 548,789 | 11/1957 | Canada. |

LAVERNE D. GEIGER, *Primary Examiner.*

ALEXANDER H. BRODMERKEL, LEWIS J. LENNY,
*Examiners.*

A. LEAVITT, C. HOUCK, *Assistant Examiners.*